(12) United States Patent
Mizusaki et al.

(10) Patent No.: US 11,319,488 B2
(45) Date of Patent: May 3, 2022

(54) LIQUID CRYSTAL DISPLAY DEVICE, METHOD FOR MANUFACTURING LIQUID CRYSTAL DISPLAY DEVICE, AND ELECTRONIC APPARATUS

(71) Applicant: SHARP KABUSHIKI KAISHA, Sakai (JP)

(72) Inventors: Masanobu Mizusaki, Sakai (JP); Tomonori Itoh, Sakai (JP); Takashi Satoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 108 days.

(21) Appl. No.: 16/498,215

(22) PCT Filed: Mar. 27, 2018

(86) PCT No.: PCT/JP2018/012597
§ 371 (c)(1),
(2) Date: Sep. 26, 2019

(87) PCT Pub. No.: WO2018/181400
PCT Pub. Date: Oct. 4, 2018

(65) Prior Publication Data
US 2021/0108143 A1   Apr. 15, 2021

(30) Foreign Application Priority Data
Mar. 31, 2017  (JP) .............................. JP2017-070038

(51) Int. Cl.
*C09K 19/38* (2006.01)
*G02F 1/1335* (2006.01)
(Continued)

(52) U.S. Cl.
CPC .... *C09K 19/3838* (2013.01); *G02F 1/133553* (2013.01); *G02F 1/133723* (2013.01);
(Continued)

(58) Field of Classification Search
CPC ........ C09K 19/3838; C09K 2019/3009; C09K 2019/122; C09K 2019/3004;
(Continued)

(56) References Cited

U.S. PATENT DOCUMENTS 6,001,277 A * 12/1999 Ichimura ........... G02F 1/133711
252/299.4
2005/0270465 A1 * 12/2005 Chae ................. G02F 1/134363
349/141
(Continued)

FOREIGN PATENT DOCUMENTS

| CN | 104115057 A | 10/2014 |
| CN | 105359032 A | 2/2016 |

(Continued)

Primary Examiner — Anthony J Frost
(74) Attorney, Agent, or Firm — ScienBiziP, P.C.

(57) ABSTRACT

A liquid crystal display device includes an element substrate, a counter substrate, a liquid crystal layer sandwiched between the element substrate and the counter substrate, reflective electrodes placed on a surface of the element substrate that is located on the liquid crystal layer side, and a pair of alignment films each of which is placed on a corresponding one of a surface of the element substrate that is located on the liquid crystal layer side and a surface of the counter substrate that is located on the liquid crystal layer side. A liquid crystal composition contained in the liquid crystal layer contains a compound containing an alkoxy group. The alignment films contain a polymer including polyimide. The polyimide is derived from a polyamic acid and contains a side chain represented by Formula (1).

6 Claims, 5 Drawing Sheets

(51) Int. Cl.
*G02F 1/1337* (2006.01)
*C09K 19/12* (2006.01)
*C09K 19/30* (2006.01)
*C09K 19/56* (2006.01)
*G02F 1/1333* (2006.01)
*C08G 73/10* (2006.01)

(52) U.S. Cl.
CPC .......... *C08G 73/10* (2013.01); *C09K 19/3098* (2013.01); *C09K 19/56* (2013.01); *C09K 2019/122* (2013.01); *C09K 2019/301* (2013.01); *C09K 2019/3004* (2013.01); *C09K 2019/3009* (2013.01); *C09K 2019/3016* (2013.01); *C09K 2019/3027* (2013.01); *C09K 2323/00* (2020.08); *G02F 1/133397* (2021.01)

(58) Field of Classification Search
CPC ........ C09K 19/3098; C09K 2019/3027; C09K 2019/301; C09K 2019/3016; C09K 19/56; G02F 1/133553; G02F 1/133723; G02F 1/13; G02F 1/1337; C08G 73/10
See application file for complete search history.

(56) References Cited

U.S. PATENT DOCUMENTS

| | | | | |
|---|---|---|---|---|
| 2007/0232780 | A1* | 10/2007 | Tamura | C08G 73/1025 528/310 |
| 2009/0194737 | A1* | 8/2009 | Lai | C08G 73/1042 252/299.4 |
| 2011/0272630 | A1* | 11/2011 | Shimada | C09K 19/3066 252/299.61 |
| 2012/0113370 | A1* | 5/2012 | Nakai | G02F 1/133711 349/123 |
| 2018/0067361 | A1 | 3/2018 | Mizusaki | |
| 2018/0113337 | A1 | 4/2018 | Mizusaki | |

FOREIGN PATENT DOCUMENTS

| | | |
|---|---|---|
| CN | 105359033 A | 2/2016 |
| CN | 106047372 A | 10/2016 |
| JP | 10-212484 A | 8/1998 |
| JP | 2015-020999 A | 2/2015 |
| TW | 201704341 A | 2/2017 |
| WO | 2016/148041 A1 | 9/2016 |
| WO | 2016/148042 A1 | 9/2016 |

* cited by examiner

LIQUID CRYSTAL DISPLAY DEVICE, METHOD FOR MANUFACTURING LIQUID CRYSTAL DISPLAY DEVICE, AND ELECTRONIC APPARATUS

TECHNICAL FIELD

Embodiments of the present invention relate to a liquid crystal display device, a method for manufacturing the liquid crystal display device, and an electronic apparatus.

The present application claims priority to Japanese Patent Application No. 2017-070038 filed on Mar. 31, 2017, the contents of which are incorporated herein by reference.

BACKGROUND ART

Hitherto, liquid crystal display devices have been widely used as displays for portable electronic apparatuses such as smartphones, televisions, and personal computers.

A liquid crystal display device includes a liquid crystal layer made of a liquid crystal composition and alignment films sandwiching the liquid crystal layer. The alignment films exert an anchoring force on liquid crystal molecules contained in the liquid crystal composition and impart a predetermined pretilt angle thereto. The performance of the alignment films significantly affects the VHR (voltage holding ratio), contrast, and the like of the liquid crystal display device, that is, the performance of the liquid crystal display device.

Therefore, various materials for forming alignment films have been investigated and proposed (see, for example, Patent Literature 1).

CITATION LIST

Patent Literature

PTL 1: Japanese Unexamined Patent Application Publication No. 2015-20999

SUMMARY OF INVENTION

Technical Problem

A so-called "flicker" is known as failure occurring in liquid crystal display devices. The term "flicker" refers to an image flickering phenomenon occurring at a frequency that can be recognized by a user (observer) of a liquid crystal display device. A flickering liquid crystal display device is likely to fatigue a user thereof and cannot be used for a long time. Therefore, liquid crystal display devices in which a flicker is unlikely to occur have been required.

Some embodiments of the present invention have been made in view of such circumstances. It is an object of the present invention to provide a liquid crystal display device in which a flicker is unlikely to occur and which has good display image quality. It is an object of the present invention to provide a method for manufacturing a liquid crystal display device in which a flicker is unlikely to occur and which has good display image quality. It is an object of the present invention to provide an electronic apparatus with good display image quality.

Solution to Problem

A "transmissive type" in which an image is displayed using light emitted from a backlight, a "reflective type" in which an image is displayed using external light without using a backlight, and a "transflective type" in which both external light and a backlight are used as light sources are known as the configuration of a liquid crystal display device. The following idea has been obtained from investigations by the inventors: an idea that, in a transmissive-type liquid crystal display device and a transflective-type liquid crystal display device, alignment films are likely to deteriorate due to reflective electrodes made of metal. The inventors have performed intensive investigations on the basis of the idea and, as a result, have completed some embodiments of the present invention.

In order to solve the above problem, an embodiment of the present invention provides a liquid crystal display device including an element substrate, a counter substrate, a liquid crystal layer sandwiched between the element substrate and the counter substrate, reflective electrodes placed on a surface of the element substrate that is located on the liquid crystal layer side, and a pair of alignment films each of which is placed on a corresponding one of a surface of the element substrate that is located on the liquid crystal layer side and a surface of the counter substrate that is located on the liquid crystal layer side. A liquid crystal composition contained in the liquid crystal layer contains a compound containing an alkoxy group. The alignment films contain a polymer including polyimide. The polyimide is derived from a polyamic acid and contains a side chain represented by the following Formula (1):

[Chem. 1]

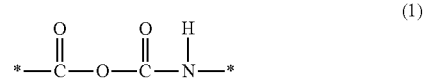 [SMILES: *NC(=O)OC(*)=O]

(1)

(where the side chain represented by Formula (1) contains a carbonyl group bonded to a main chain of the polyimide).

In an embodiment of the present invention, the side chain may have a configuration that is the following Formula (2):

[Chem. 2]

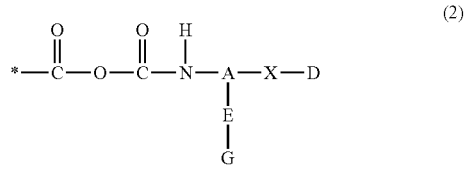

(2)

(where A represents a group obtained by removing three hydrogen atoms from benzene, a linear alkane containing one to 12 carbon atoms, a branched alkane containing one to 12 carbon atoms, a cyclic alkane containing one to 12 carbon atoms, a linear alkene containing one to 12 carbon atoms, a branched alkene containing one to 12 carbon atoms, or a cyclic alkene containing one to 12 carbon atoms or a direct bond; a hydrogen atom contained in A may be substituted with a fluorine atom, a chlorine atom, or a bromine atom;

X and E represent a —COO— group, a —OCO— group, a —O— group, a —CONH— group, a —NHCO— group, a —NH— group, a —S— group, or a direct bond and may be the same as or different from each other;

D and G represent a hydrogen atom, a phenyl group, a linear alkyl group containing one to 12 carbon atoms, a branched alkyl group containing one to 12 carbon atoms, a cyclic alkyl group containing one to 12 carbon atoms, a linear alkenyl group containing one to 12 carbon atoms, a branched alkenyl group containing one to 12 carbon atoms, or a cyclic alkenyl group containing one to 12 carbon atoms and may be the same as or different from each other; a hydrogen atom contained in D or G may be substituted with a fluorine atom, a chlorine atom, or a bromine atom; and when A is the direct bond, a —NH— group, bonded to A in Formula (2), different from X and E is bonded to X and E and G are not contained in the formula).

In an embodiment of the present invention, the side chain may have a configuration that is at least one selected from the group consisting of the following Formulas ((B-201 to (B-211)):

[Chem. 3]

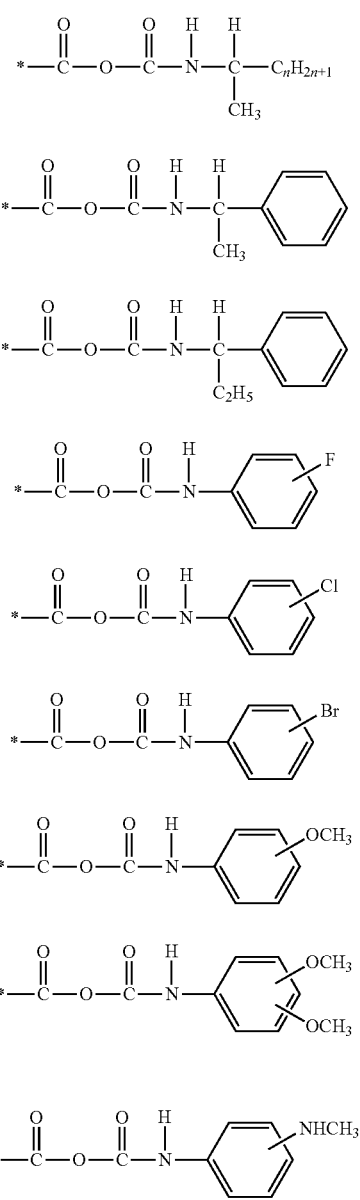

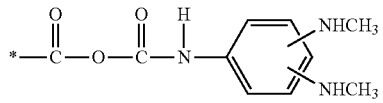

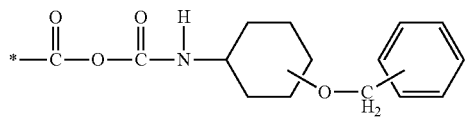

(where n is an integer of 1 to 10).

In an embodiment of the present invention, the reflective electrodes may have a configuration that is at least one selected from the group consisting of Al, Ag, Cu, and Zn, and alloys of these.

In an embodiment of the present invention, the liquid crystal composition may have a configuration that has negative dielectric anisotropy and that contains liquid crystal molecules containing a functional group represented by the following Formula (B):

[Chem. 4]

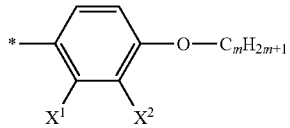

(where one of $X^1$ and $X^2$ represents a fluorine atom or a chlorine atom and the other represents a hydrogen atom, a fluorine atom, or a chlorine atom and m is an integer of 1 to 8).

In an embodiment of the present invention, the liquid crystal composition may have a configuration that has a dielectric anisotropy of −4.0 or less.

In an embodiment of the present invention, a configuration may be a VA mode, an IPS mode, or a FFS mode.

An embodiment of the present invention provides a method for manufacturing a liquid crystal display device. The method includes a step of forming a polyimide film in such a manner that a polyamic acid is applied to a substrate provided with reflective electrodes so as to cover the reflective electrodes and is baked, a step of obtaining an alignment film by allowing a carboxy group contained in the polyimide film to react with an isocyanate compound, and a step of obtaining the liquid crystal display device using the substrate provided with the reflective electrodes and a counter substrate to sandwich a liquid crystal composition.

In an embodiment of the present invention, a manufacturing method may be such that the step of obtaining the alignment film is performed in such a manner that the substrate provided with the polyimide film is immersed in a solution of the isocyanate compound and is heated.

In an embodiment of the present invention, a manufacturing method may be such that the solution is an isopropyl alcohol solution of the isocyanate compound.

In an embodiment of the present invention, the isocyanate compound may be a configuration that is the following Formula (4):

[Chem. 5]

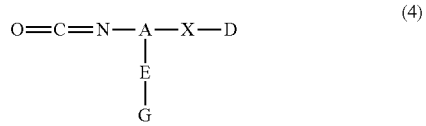

(4)

(where A represents a group obtained by removing three hydrogen atoms from benzene, a linear alkane containing one to 12 carbon atoms, a branched alkane containing one to 12 carbon atoms, a cyclic alkane containing one to 12 carbon atoms, a linear alkene containing one to 12 carbon atoms, a branched alkene containing one to 12 carbon atoms, or a cyclic alkene containing one to 12 carbon atoms or a direct bond;

X and E represent a —COO— group, a —OCO— group, a —O— group, a —CONH— group, a —NHCO— group, a —NH— group, a —S— group, or a direct bond and may be the same as or different from each other;

D and G represent a hydrogen atom, a phenyl group, a linear alkyl group containing one to 12 carbon atoms, a branched alkyl group containing one to 12 carbon atoms, a cyclic alkyl group containing one to 12 carbon atoms, a linear alkenyl group containing one to 12 carbon atoms, a branched alkenyl group containing one to 12 carbon atoms, or a cyclic alkenyl group containing one to 12 carbon atoms and may be the same as or different from each other; and when A is the direct bond, a —NH— group in Formula (2) is bonded to X and E and G are not contained in the formula).

Furthermore, an embodiment of the present invention provides an electronic apparatus including the above liquid crystal display device.

Advantageous Effects of Invention

According to an embodiment of the present invention, a liquid crystal display device in which a flicker is unlikely to occur and which has good display image quality and a method for manufacturing the liquid crystal display device can be provided. Furthermore, an electronic apparatus with good display image quality can be provided.

DESCRIPTION OF EMBODIMENTS

First Embodiment (Liquid Crystal Display Device)

Figure 1:
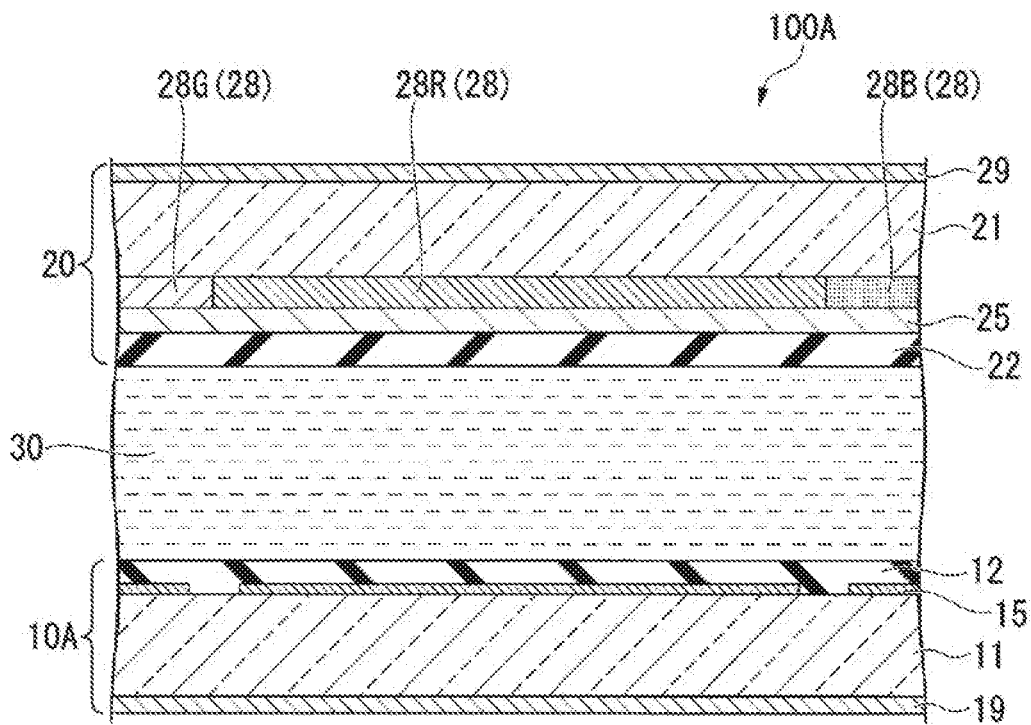
FIG. 1 is a schematic sectional view of a liquid crystal display device according to a first embodiment of the present invention.

FIG. 1 is a schematic sectional view of a liquid crystal display device 100A according to this embodiment of the present invention. As shown in FIG. 1, the liquid crystal display device 100A includes an element substrate 10A, a counter substrate 20, and a liquid crystal layer 30.

The liquid crystal display device 100A according to this embodiment has a VA (vertical alignment) and ECB mode device configuration. That is, the liquid crystal display device 100A is a vertical alignment type of liquid crystal display device. A liquid crystal display device according to an embodiment of the present invention is not limited to the vertical alignment type of liquid crystal display device and is applicable to liquid crystal display devices in various alignment modes. Examples of the alignment mode of a usable liquid crystal display device include IPS (in-plane switching), FFS (fringe field switching), and VA.

(Element Substrate)

The element substrate 10A includes a TFT substrate 11, a first alignment film 12, a plurality of pixel electrodes 15, and a first polarizer 19.

The TFT board 11 includes driving TFT elements, which are not shown. The drain electrode, gate electrode, and source electrode of each of the driving TFT elements are electrically connected to a corresponding one of the pixel electrodes 15, a gate bus line, and a source bus line, respectively. Pixels are electrically connected to each other with electric lines such as the gate bus line and the source bus line.

Usually known materials can be used for members of the TFT substrate 11. IGZO (a quaternary alloy semiconductor material containing indium (In), gallium (Ga), zinc (Zn), and oxygen (O)) is preferably used as material for semiconductor layers of driving TFTs. In a case where IGZO is used to as material for forming the semiconductor layers, the off-state leakage currents in the obtained semiconductor layers are small and therefore the leakage of charges is suppressed. This enables an idling period after the application of a voltage to the liquid crystal layer 30 to be extended. As a result, the number of times that a voltage is applied during a period in which an image is displayed can be reduced, thereby reducing the power consumption of the liquid crystal display device 100A.

The TFT substrate 11 may be an active matrix type in which each pixel includes a driving TFT or may be a simple matrix type of liquid crystal display device in which each pixel includes no driving TFT.

The first alignment film 12 is placed on a surface of the TFT substrate 11 that is located on the liquid crystal layer 30 side. The first alignment film 12 is a vertical alignment film made of a polymer including polyimide. The first alignment film 12 is, for example, a vertical alignment film.

The polyimide forming the first alignment film 12 is derived from a polyamic acid and is obtained by intramolecularly cyclizing (imidizing) the polyamic acid.

In particular, those described below can be exemplified as the polyamic acid, which is a precursor of the polyimide.

The followings can be exemplified as the polyamic acid: one which has a polyamic acid skeleton represented by Formula (10) below and in which an X unit contained in the polyamic acid is Formulas (X-1) to (X-11) below and one in which an E unit is Formulas (E-1) to (E-16) below. As the X unit, four bondable sites are shown. To the four bondable sites, two carbonyl groups are bonded when being introduced to the position of X in Formula (10) and two carboxy groups, which are not shown, are bonded.
[Chem. 6]
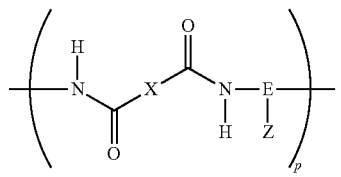
(10)
[Chem. 7]
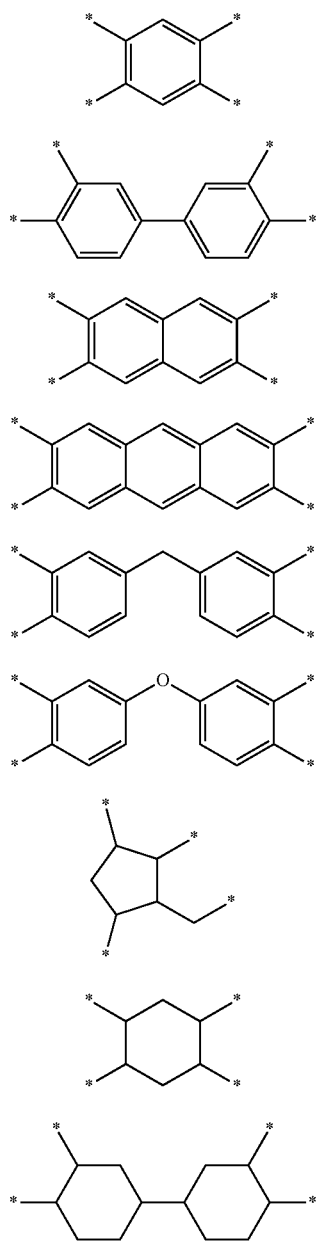
(X-1)
(X-2)
(X-3)
(X-4)
(X-5)
(X-6)
(X-7)
(X-8)
(X-9)
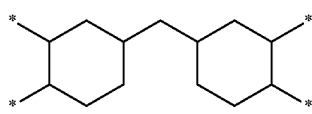
(X-10)
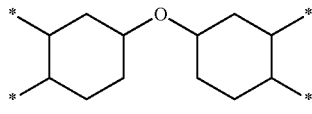
(X-11)
[Chem. 8]
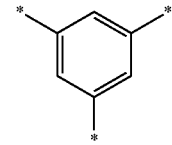
(E-1)
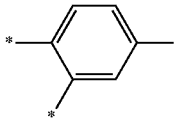
(E-2)
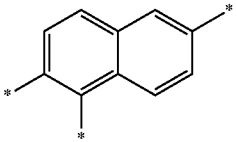
(E-3)
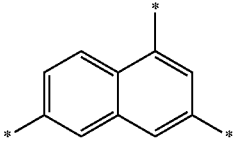
(E-4)
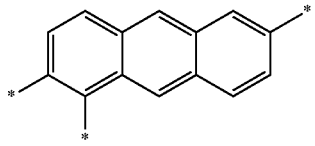
(E-5)
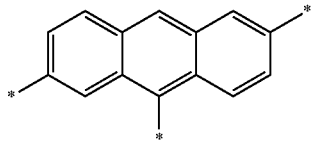
(E-6)
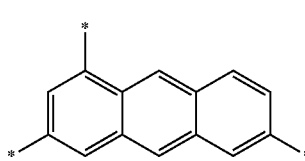
(E-7)
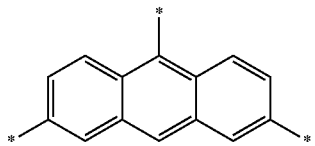
(E-8)

Furthermore, one having a photofunctional group at any position in the X unit and the E unit can be exemplified as the precursor having the polyamic acid skeleton. Formulas (X-101) to (X-105) below can be exemplified as a photofunctional group that the X unit may contain. Formulas (E-101) to (E-108) below can be exemplified as a photofunctional group that the E unit may contain.

-continued

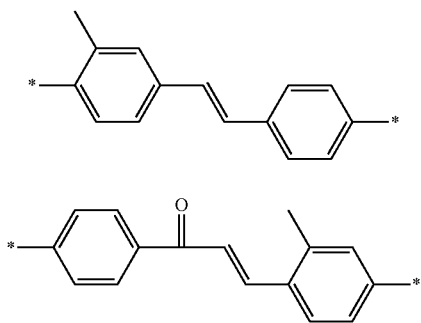
(E-106)

(E-107)

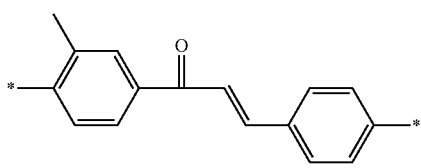
(E-108)

When an alignment film is a vertical alignment film like the alignment films of this embodiment, Formulas (Z-1) to (Z-8) below can be exemplified as a Z unit contained in the polyamic acid.

[Chem. 12]

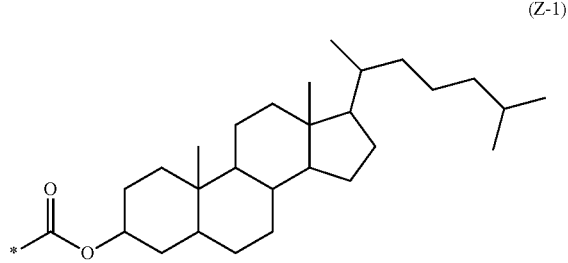
(Z-1)

(Z-2)

[Chem. 13]

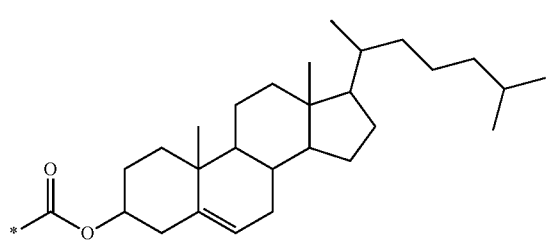
(Z-3)

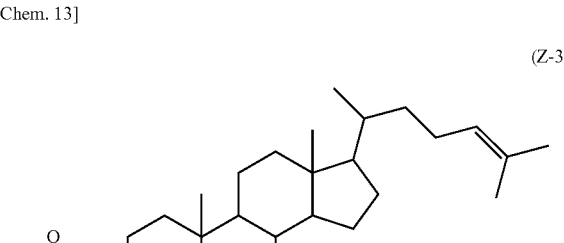
(Z-4)

[Chem. 14]

(Z-5)

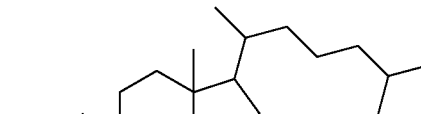

(Z-6)

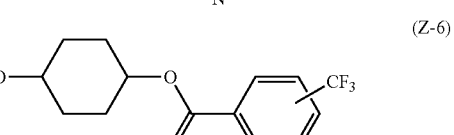

(Z-7)

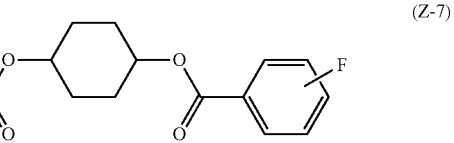

(Z-8)

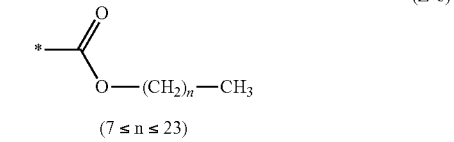

$(7 \leq n \leq 23)$

In a case where a liquid crystal display device according to an embodiment of the present invention is applied to a liquid crystal display device including horizontal alignment films, a hydrogen atom, an alkyl group containing one to four carbon atoms, a cycloalkyl group containing three to eight carbon atoms, and an aromatic group containing four to eight carbon atoms can be exemplified as a Z group contained in polyimide (polyamic acid) which is material for forming the horizontal alignment films. In the alkyl group, the cycloalkyl group, and the aromatic group, one or more hydrogen atoms may be substituted with fluorine atoms or chlorine atoms.

In a surface of the first alignment film 12, the polyimide forming the first alignment film 12 has a side chain, bonded thereto, represented by Formula (1) below.

[Chem. 15]

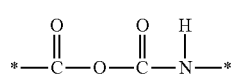
(1)

(Incidentally, the side chain represented by Formula (1) contains a carbonyl group bonded to a main chain of the polyimide.)

In particular, the side chain is one represented by Formula (2) below.

[Chem. 16]

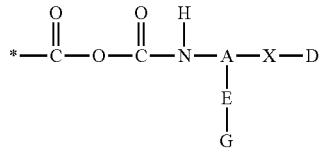

(2)

In the formula, A represents a group obtained by removing three hydrogen atoms from benzene, a linear alkane containing one to 12 carbon atoms, a branched alkane containing one to 12 carbon atoms, a cyclic alkane containing one to 12 carbon atoms, a linear alkene containing one to 12 carbon atoms, a branched alkene containing one to 12 carbon atoms, or a cyclic alkene containing one to 12 carbon atoms or a direct bond.

A hydrogen atom contained in A may be substituted with a fluorine atom, a chlorine atom, or a bromine atom.

X and E each represent a —COO— group, a —OCO— group, a —O— group, a —CONH— group, a —NHCO— group, a —NH— group, a —S— group, or a direct bond. X and E may be the same as or different from each other.

D and G represent a hydrogen atom, a phenyl group, a linear alkyl group containing one to 12 carbon atoms, a branched alkyl group containing one to 12 carbon atoms, a cyclic alkyl group containing one to 12 carbon atoms, a linear alkenyl group containing one to 12 carbon atoms, a branched alkenyl group containing one to 12 carbon atoms, or a cyclic alkenyl group containing one to 12 carbon atoms. D and G may be the same as or different from each other.

A hydrogen atom contained in D or G may be substituted with a fluorine atom, a chlorine atom, or a bromine atom.

In Formula (2), when A is the direct bond, a —NH— group, bonded to A, different from X and E is bonded to X and E and G are not contained in the formula.

The side chain is preferably at least one selected from the group consisting of Formulas (B-201) to (B-211) below.

[Chem. 17]

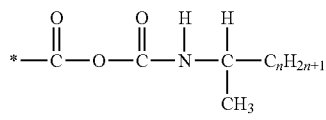 (B-201)

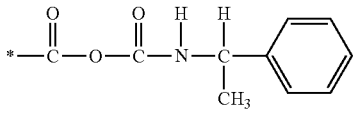 (B-202)

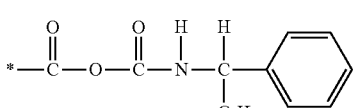 (B-203)

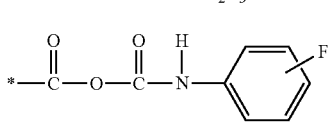 (B-204)

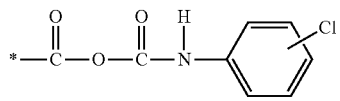 (B-205)

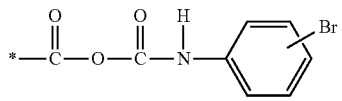 (B-206)

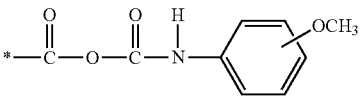 (B-207)

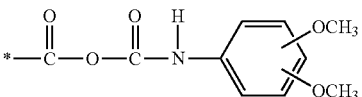 (B-208)

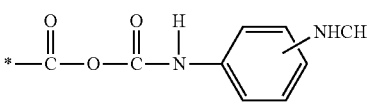 (B-209)

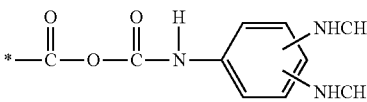 (B-210)

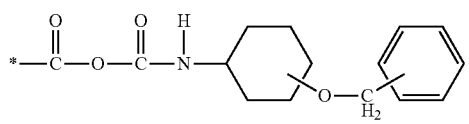 (B-211)

The pixel electrodes 15 are placed on the TFT substrate 11, are sandwiched between the TFT substrate 11 and the first alignment film 12, and are in contact with the first alignment film 12. The pixel electrodes 15 are arranged to correspond to the pixels of the liquid crystal display device 100A. The pixel electrodes 15 are made of a metal material and have light-reflecting properties. The pixel electrodes 15 correspond to reflective electrodes in an embodiment of the present invention.

Material for forming the pixel electrodes 15 is preferably at least one selected from the group consisting of Al, Ag, Zn, Cu, and alloys of these.

A surface of the pixel electrodes 15 may have a fine irregular texture. The fine irregular texture is known as a micro reflective structure (MRS). Such an irregular texture (MRS) has the function of scattering external light in the case of reflecting external light to expand the viewing angle.

The first polarizer 19 is placed on the side of the TFT substrate 11 opposite to the liquid crystal layer 30. The first polarizer 19 used may be one having a usually known configuration.

(Counter Substrate)

The counter substrate 20 includes, for example, a substrate body 21, a second alignment film 22, a common electrode 25, a color filter layer 28, and a second polarizer 29.

The substrate body 21 is a plate-shaped member having light-transmitting properties. Material for forming the substrate body 21 may be a inorganic material, such as glass, quartz glass, or silicon nitride, having light-transmitting properties; a organic polymer, such as an acrylic resin or a polycarbonate resin, having light-transmitting properties; or a composite material formed by stacking or mixing these materials.

The second alignment film 22 is an alignment film containing a polymer including polyimide. The second alignment film 22 is, for example, a vertical alignment film.

The polyimide forming the second alignment film 22 is derived from a polyamic acid and is obtained by intramolecularly cyclizing (imidizing) the polyamic acid. Material for forming the second alignment film 22 may be the same as material for forming the first alignment film 12.

The common electrode 25 is placed between the substrate body 21 and the second alignment film 22. The common electrode 25 has light-transmitting properties and is placed substantially over a surface of the substrate body 21. For example, a transparent conductive material such as ITO (indium tin oxide) or IZO (indium zinc oxide) can be cited as material for forming the common electrode 25.

The color filter layer 28 is placed between the substrate body 21 and the common electrode 25.

The color filter layer 28 includes, for example, red color filter layers 28R which absorb a portion of incident light and which transmit red light, green color filter layers 28G which absorb a portion of incident light and which transmit green light, and blue color filter layers 28B which absorb a portion of incident light and which transmit blue light.

The color filter layer 28 may further include an overcoat layer covering a surface for the purpose of planarizing a substrate surface and for the purpose of preventing the dissolution of a colorant component from the color filter layer 28.

The second polarizer 29 used may be one having a usually known configuration. The first polarizer 19 and the second polarizer 29 are arranged in, for example, a crossed Nicol state.

(Liquid Crystal Layer)

The liquid crystal layer 30 is made of a liquid crystal composition containing material (a liquid crystal material) containing liquid crystal molecules having liquid crystallinity.

The liquid crystal material may be composed of only liquid crystal molecules exhibiting liquid crystallinity alone or may be a composition which is a mixture of the liquid crystal molecules exhibiting liquid crystallinity alone and liquid crystal molecules exhibiting no liquid crystallinity alone and which exhibits liquid crystallinity as a whole.

When the liquid crystal material is a negative liquid crystal with negative dielectric anisotropy, the dielectric anisotropy of the liquid crystal material is preferably −4.0 or less.

The liquid crystal material preferably contains liquid crystal molecules containing a functional group represented by Formula (B) below.

[Chem. 18]

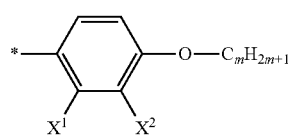

(B)

(where $X^1$ and $X^2$ independently represent a hydrogen atom, a fluorine atom, or a chlorine atom and m is an integer of 1 to 8.)

For example, Formulas (B-1) to (B-5) below can be exemplified as usable liquid crystal molecules.

[Chem. 19]

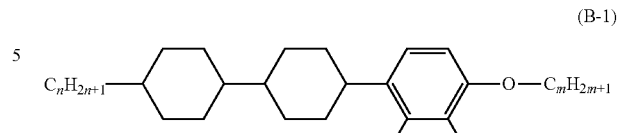

(B-1)

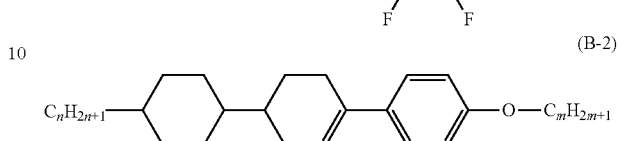

(B-2)

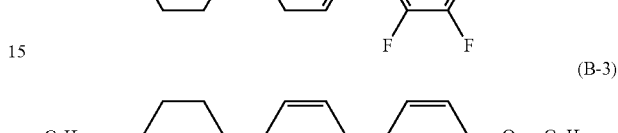

(B-3)

(B-4)

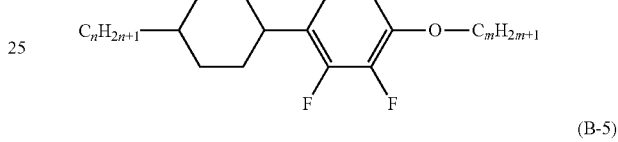

(B-5)

(where m and n are independently an integer of 1 to 8.)

As such a compound, for example, a compound represented by Formula (B-10) below can be cited. The compound represented by Formula (B-10) is one that, in the compound represented by Formula (B-3), m=2 and n=3.

[Chem. 20]

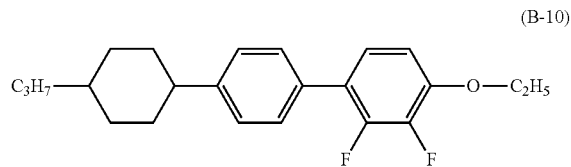

(B-10)

The liquid crystal material preferably contains at least one compound (alkenyl compound) selected from the group consisting of Formulas (C-1) to (C-4) below. A liquid crystal material containing such an alkenyl compound has increased response speed. Therefore, using the liquid crystal material containing such an alkenyl compound in a liquid crystal layer enables a liquid crystal display device with high image quality to be provided.

[Chem. 21]

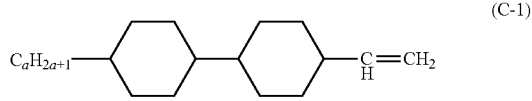

(C-1)

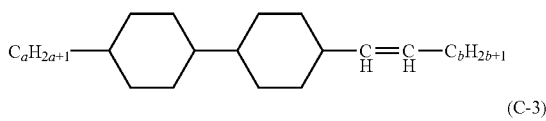

(C-2)

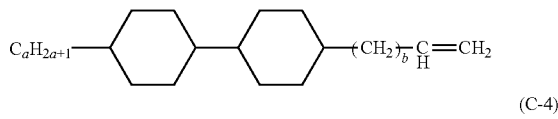

(C-3)

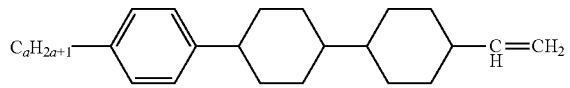

(C-4)

(where a and b are independently an integer of 1 to 6.)

As such a compound, for example, a compound represented by Formula (C-10) below can be cited. The compound represented by Formula (C-10) is one that, in the compound represented by Formula (C-1), a=3.

[Chem. 22]

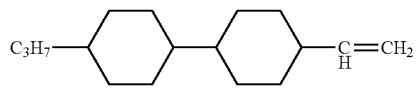

(C-10)

In the liquid crystal display device 100A, the first alignment film 12 and the second alignment film 22 are configured as described above and therefore an effect below is provided.

Figure 2:
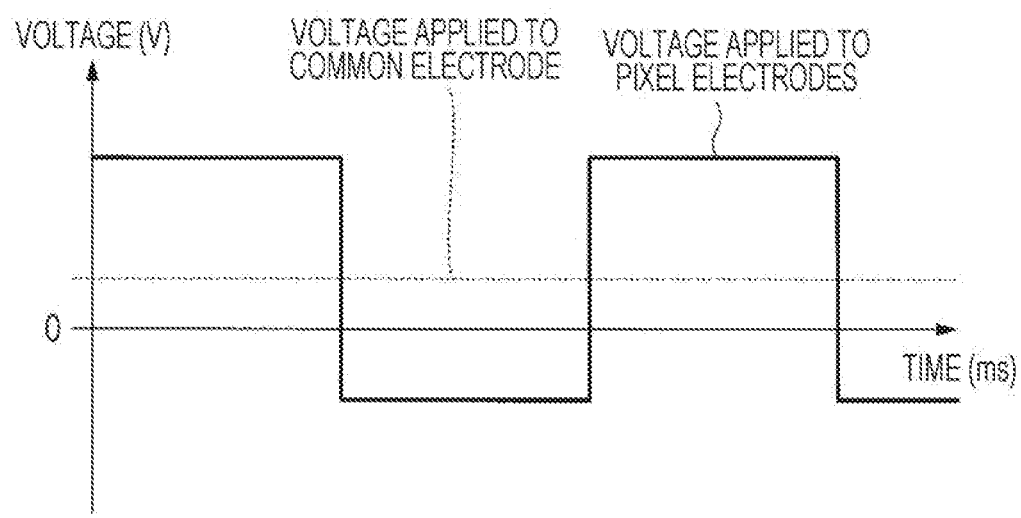
FIG. 2 is an illustration showing the waveform of the voltage applied to an electrode upon displaying an image on a liquid crystal display device.

FIG. 2 is an illustration showing the waveform of the voltage applied to an electrode upon displaying an image on a liquid crystal display device 100A. As shown in FIG. 2, upon displaying an image, a constant voltage is applied to a common electrode and a square wave voltage is applied to pixel electrodes.

When a dielectric having a n-conjugated system such as an aromatic group is in contact with the pixel electrodes, in which the voltage applied thereto varies as described above, a charge interaction occurs between each pixel electrode and the dielectric and electrons or holes move from the pixel electrode to the dielectric.

That is, in a case where the dielectric having the aromatic group is in contact with the pixel electrode, when a square wave voltage is applied to the pixel electrode, electrons or holes move from the pixel electrode to the dielectric or move from the dielectric to the pixel electrode. This can be conceived as follows: a redox reaction is continuously repeated in the dielectric, which is in contact with the pixel electrode, while a square wave voltage is being applied to the pixel electrode.

Continuously carrying out such a reaction allows radicals or ions to be formed in the dielectric, which has the aromatic group. The formed radicals or ions cause a flicker or sticking on a liquid crystal display device.

The above reaction is likely to occur in a case where the pixel electrode is readily ionized, in particular, in a case where the pixel electrode is made of Al, Cu, Ag, Zn, or an alloy of these. When the pixel electrode is made of these metals, many electrons or holes are generated on a surface of the electrode. Therefore, charges are likely to move into the dielectric.

In the liquid crystal display device 100A, the first alignment film 12, which is made of polyimide, corresponds to the "dielectric having the aromatic group" in contact with the pixel electrode.

Herein, it is thought that, when the polyamic acid, which is material for forming the polyimide, is present in the first alignment film 12, a carboxy group, which has high reactivity, reacts in a case where radicals or ions are formed.

On the basis of the above thought, the inventors have obtained an idea that a flicker or sticking is likely to occur when carboxy groups remain in an alignment film. The inventors have performed intensive investigations on the basis of the idea and, as a result, have found that reducing the number of carboxy groups in an alignment film enables a liquid crystal display device in which a flicker or sticking is unlikely to occur to be obtained.

That is, in the liquid crystal display device 100A, a carboxy group remaining in the alignment film reacts and is converted into the side chain represented by Formula (1). The reaction of the carboxy group is described below in detail. This reduces the number of carboxy groups remaining on a surface of the first alignment film 12 and therefore ions or radicals are unlikely to be formed even if electrons or holes are injected from the pixel electrodes.

According to a liquid crystal display device having such a configuration as described above, a liquid crystal display device in which a flicker is unlikely to occur and which has good display image quality can be provided.

Second Embodiment

Figure 3:
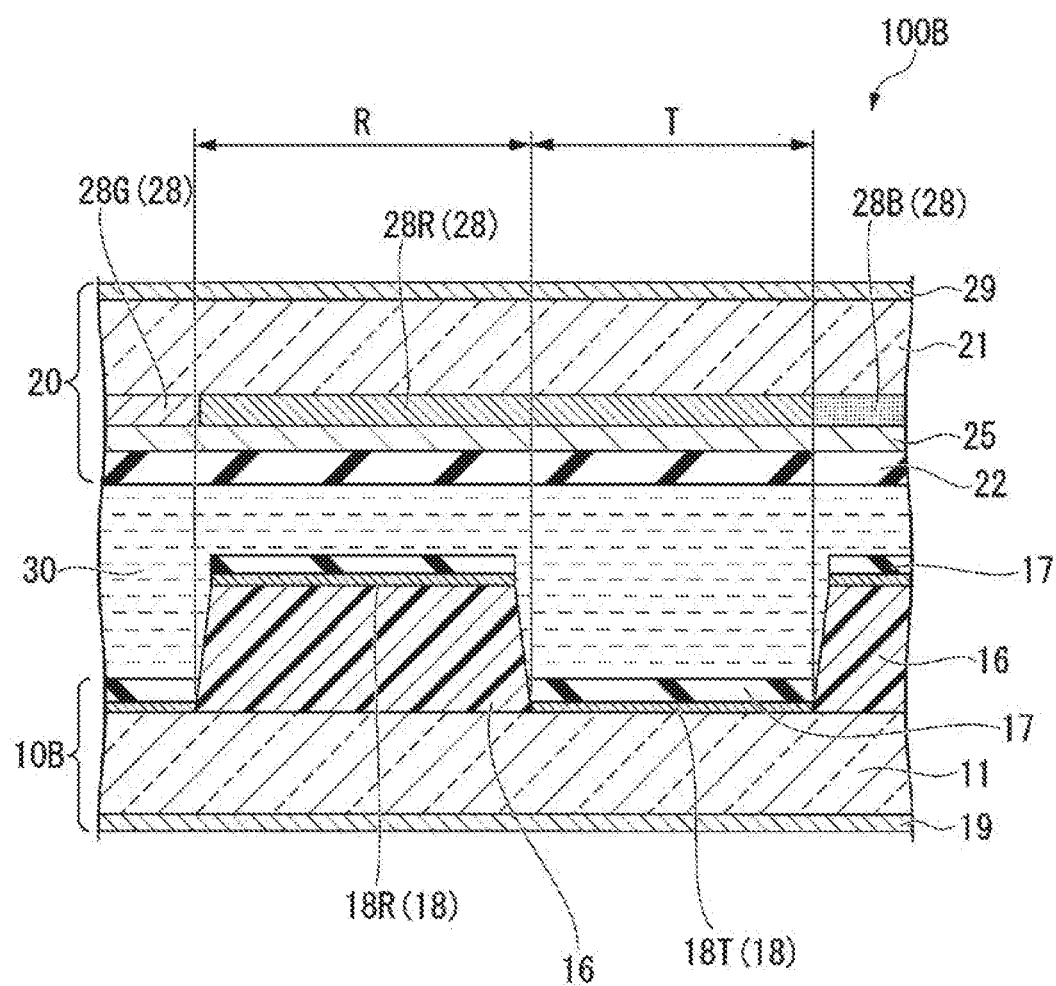
FIG. 3 is a schematic sectional view of a liquid crystal display device according to a second embodiment of the present invention.

FIG. 3 is a schematic sectional view of a liquid crystal display device 100B according to a second embodiment of the present invention. As shown in FIG. 3, the liquid crystal display device 100B includes an element substrate 10B, a counter substrate 20, and a liquid crystal layer 30. In this embodiment, components common to those in the first embodiment are given the same reference numerals and will not be described in detail.

The liquid crystal display device 100B is a semi-transmissive liquid crystal display device including pixels each of which includes a transmissive display region T displaying an image by transmitting light from a backlight and a reflective display region R displaying an image by reflecting external light incident from the counter substrate 20 side.

The element substrate 10B includes a TFT substrate 11, retardation layers 16, first alignment films 17, a plurality of pixel electrodes 18, and a first polarizer 19.

Each of the retardation layers 16 is placed in a corresponding one of the reflective display regions R. The retardation layers 16 are made of an ultraviolet curable resin and can be formed by a usually known method. Each of the retardation layers 16 has the function of compensating for the phase difference between an image on a corresponding one of the transmissive display regions T and an image on a corresponding one of the reflective display regions R.

The first alignment films 17 are placed substantially over the TFT substrate 11 when the TFT substrate 11 is viewed from above. Each of the first alignment films 17 is placed above the upper surface of a corresponding one of the retardation layers 16 and a corresponding one of regions where none of the retardation layers 16 is placed on the upper surface of the TFT substrate 11.

The first alignment films 17 may have substantially the configuration as that of the first alignment film 12 according to the first embodiment.

Each of the pixel electrodes 18 includes a reflective electrode 18R placed on the upper surface of a corresponding one of the retardation layers 16 and a transmissive electrode 18T placed in a corresponding one of the regions where none of the retardation layers 16 is placed on the upper surface of the TFT substrate 11. Each of the reflective electrodes 18R is placed between a corresponding one of the retardation layers 16 and a corresponding one of the first alignment films 17. Each of the transmissive electrodes 18T is placed between the TFT substrate 11 and a corresponding one of the first alignment films 17.

The reflective electrodes 18R may have substantially the configuration as that of the pixel electrodes 15 according to the first embodiment.

The transmissive electrodes 18T have light-transmitting properties. For example, a transparent conductive material such as ITO (indium tin oxide) or IZO (indium zinc oxide) can be cited as the transmissive electrodes 18T forming material.

A liquid crystal display device which dissolves the problem of the present application that may possibly occur in the reflective electrodes 18R, in which a flicker is unlikely to occur, and which has good display image quality can be provided, although the liquid crystal display device is semi-transmissive.

Third Embodiment (Method for Manufacturing Liquid Crystal Display Device)

A method for manufacturing a liquid crystal display device according to the third embodiment of the present invention includes a step of forming a polyimide film in such a manner that a polyamic acid is applied to a substrate provided with reflective electrodes so as to cover the reflective electrodes and is baked, a step of obtaining an alignment film by allowing a carboxy group contained in the polyimide film to react with an isocyanate compound, and a step of obtaining the liquid crystal display device using the substrate provided with the reflective electrodes and a counter substrate to sandwich a liquid crystal composition.

(Step of Forming Polyimide Film)

First, the polyimide film is formed in such a manner that the polyamic acid is applied so as to cover the reflective electrodes (pixel electrodes), which are placed on a TFT substrate, and is baked (the step of forming the polyimide film).

The polyamic acid is dissolved in an appropriate solvent to form a polyamic acid solution, which is applied to a reflective substrate.

Baking the polyamic acid causes intramolecular cyclization (imidization) to produce polyimide. On the other hand, as imidization proceeds, the reactivity of a polyamic acid moiety decreases gradually, resulting in a saturated state in which imidization does not proceed even if the baking temperature or the baking time is varied. Thus, ordinary polyimide formed from the polyamic acid contains unreacted polyamic acid moieties remaining in a molecule thereof.

Next, the alignment film (first alignment film) is obtained by allowing the carboxy group contained in the polyimide film to react with the isocyanate compound (the step of obtaining the alignment film).

The isocyanate compound, which is used for reaction, is preferably one represented by Formula (4) below.

[Chem. 23]

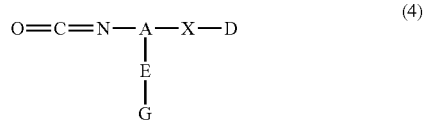

(4)

In the formula, A represents a group obtained by removing three hydrogen atoms from benzene, a linear alkane containing one to 12 carbon atoms, a branched alkane containing one to 12 carbon atoms, a cyclic alkane containing one to 12 carbon atoms, a linear alkene containing one to 12 carbon atoms, a branched alkene containing one to 12 carbon atoms, or a cyclic alkene containing one to 12 carbon atoms or a direct bond.

X and E represent a —COO— group, a —OCO— group, a —O— group, a —CONH— group, a —NHCO— group, a —NH— group, a —S— group, or a direct bond. X and E may be the same as or different from each other.

D and G represent a hydrogen atom, a phenyl group, a linear alkyl group containing one to 12 carbon atoms, a branched alkyl group containing one to 12 carbon atoms, a cyclic alkyl group containing one to 12 carbon atoms, a linear alkenyl group containing one to 12 carbon atoms, a branched alkenyl group containing one to 12 carbon atoms, or a cyclic alkenyl group containing one to 12 carbon atoms. D and G may be the same as or different from each other.

When A is the direct bond, a —NH— group in Formula (2) is bonded to X and E and G are not contained in the formula.

In this step, it is preferable that the isocyanate compound is dissolved in an organic solvent to form a solution and the solution is contacted with the polyimide film. The organic solvent used may be various solvents unreactive with the isocyanate compound.

For example, this step can be performed in such a manner that the substrate provided with the polyimide film is immersed in a solution of the isocyanate compound and is heated. The heating temperature is preferably a temperature lower than the boiling point of a solvent contained in the solution.

The isocyanate compound solution is preferably an isopropyl alcohol solution of the isocyanate compound.

The isocyanate compound reacts with the carboxy group contained in the polyimide film, whereby a side chain represented by Formula (1) below is formed on a surface of the polyimide film. Formula (1) is the same as Formula (1) described in the first embodiment.

[Chem. 24]

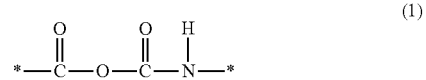

(1)

(Incidentally, the side chain represented by Formula (1) contains a carbonyl group bonded to the main chain of polyimide.)

When the isocyanate compound used is a compound represented by Formula (4), a side chain represented by Formula (2) below is formed on a surface of the polyimide film. Formula (2) is the same as Formula (2) described in the first embodiment.

[Chem. 25]

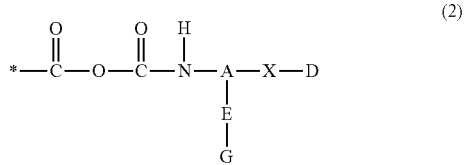

(2)

Next, the substrate provided with the reflective electrodes and the counter substrate are used to sandwich the liquid crystal composition and are appropriately sealed such that the liquid crystal composition is sealed, whereby the liquid crystal display is formed (the step of obtaining the liquid crystal display device).

According to a liquid crystal display device having the above configuration, a method for manufacturing a liquid crystal display device with good display image quality can be provided.

Fourth Embodiment

<Electronic Apparatus>

FIGS. 4 to 7 are schematic views of an electronic apparatus according to the forth embodiment of the present invention. The electronic apparatus according to this embodiment includes the liquid crystal panel 100A or 100B according to the first or second embodiment and a control device supplying a driving signal to the liquid crystal panel 100A or 100B.

Figure 4:
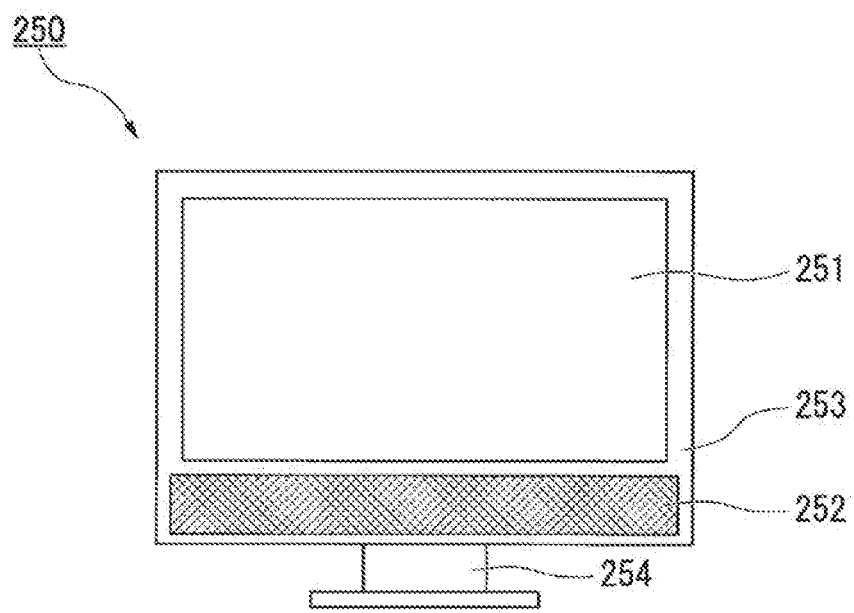
FIG. 4 is a schematic view of an electronic apparatus according to the fourth embodiment of the present invention.

FIG. 4 shows a flat-panel television 250 including a display section 251, a speaker 252, a cabinet 253, a stand 254, and the like. The above-mentioned liquid crystal display device can be successfully used as the display section 251. This enables high contrast and good display image quality to be achieved.

Figure 5:
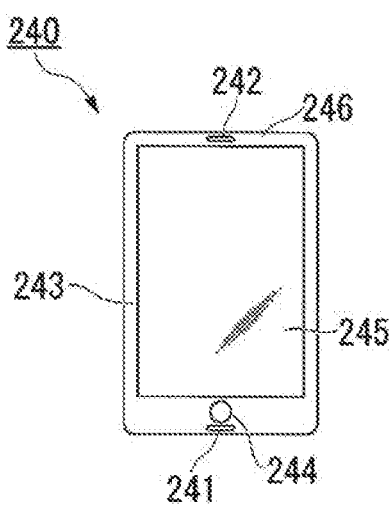
FIG. 5 is a schematic view of the electronic apparatus according to the fourth embodiment of the present invention.

FIG. 5 shows a smartphone 240 including a voice input section 241, a voice output section 242, an operation switch 244, a display section 245, a touch panel 243, a housing 246, and the like. The above-mentioned liquid crystal display device can be successfully used as the display section 245. This enables high contrast and good display image quality to be achieved.

Figure 6:
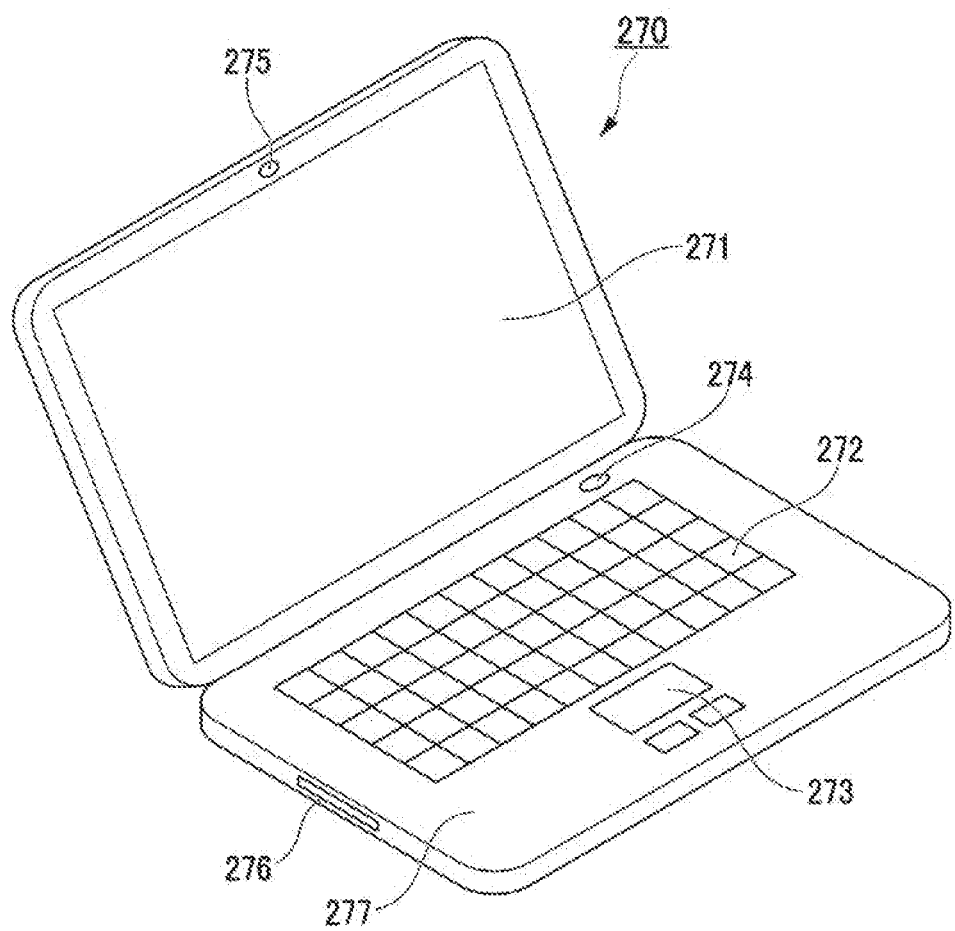
FIG. 6 is a schematic view of the electronic apparatus according to the fourth embodiment of the present invention.

FIG. 6 shows a notebook personal computer 270 including a display section 271, a keyboard 272, a touch pad 273, a main switch 274, a camera 275, a recording media slot 276, a housing 277, and the like.

The above-mentioned liquid crystal display device can be successfully used as the display section 271. This enables high contrast and good display image quality to be achieved.

Figure 7:
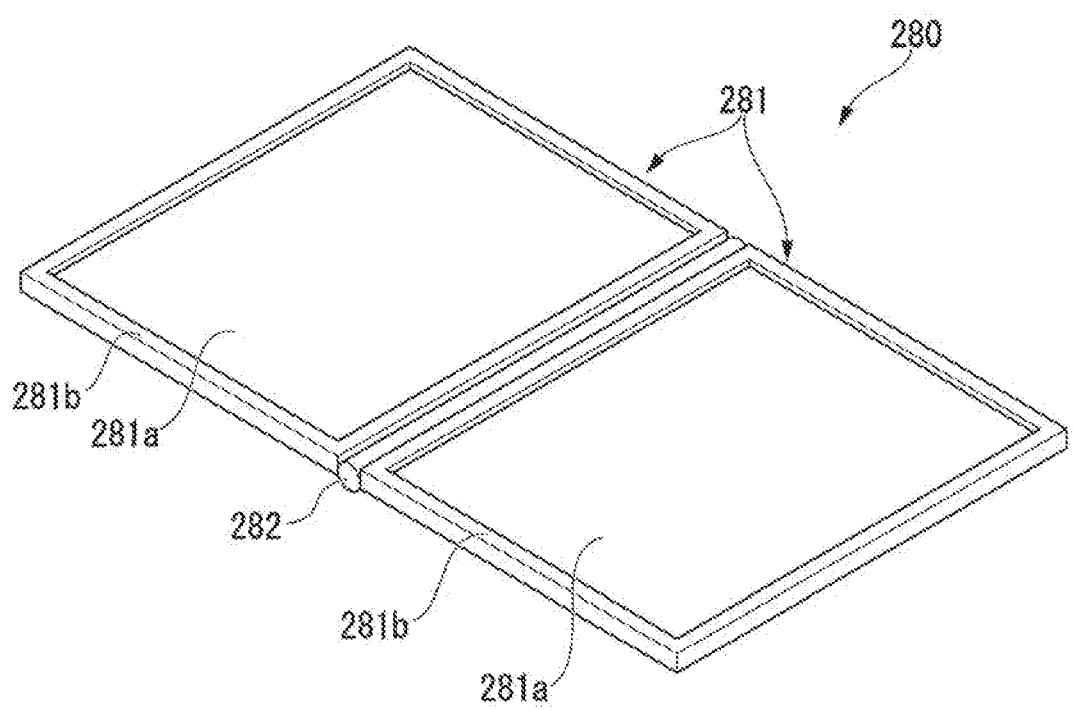
FIG. 7 is a schematic view of the electronic apparatus according to the fourth embodiment of the present invention.

FIG. 7 shows a mobile electronic apparatus 280 including two display sections 281 and a hinge mechanism 282 connecting the two display sections 281 together. Since the mobile electronic apparatus 280 includes the hinge mechanism 282, the display sections 281 can be folded. Each display section 281 includes a display panel 281a and a housing 281b. The above-mentioned liquid crystal display device can be successfully used as the display panel 281a. This enables high contrast and good display image quality to be achieved.

A free-form-surface lens may be placed on each of the display sections 281. The presence of the lenses enables images on the two display sections 281 to be seamlessly displayed.

The electronic apparatus according to this embodiment is such that the above-mentioned liquid crystal display device is used as a display section. This enables high contrast and good display image quality to be achieved.

While preferred embodiments of the present invention have been described with reference to the attached drawings, it is needless to say that the present invention is not limited to these embodiments. The shapes, combinations and the like of the components shown in the above-mentioned embodiments are only examples and may be variously modified on the basis of design requirements or the like without departing from the spirit of the present invention.

EXAMPLES

The present invention is described below with reference to examples. The present invention is not limited to the examples.

(VHR (Voltage Holding Ratio))

Measurement was performed under 1 V and 70° C. conditions using a 6254-type VHR measurement system manufactured by TOYO Corporation. Herein, the VHR refers to the ratio at which the charge charged during one frame is held.

A liquid crystal display device with higher VHR can be judged better. A liquid crystal display device with a smaller reduction in VHR before and after a durability test can be judged more durable and better.

(Residual DC)

Measurement was performed at 30° C. by a flicker elimination method. The residual DC (rDC) was measured after applying a DC offset voltage of 2 V (60 Hz square wave) for two hours.

A liquid crystal display device with a smaller rDC can be judged better. A liquid crystal display device with a smaller increase in rDC before and after the durability test can be judged more durable and better.

In examples and comparative examples below, the VHR and the residual DC are measured under conditions below before and after the durability test and an effect of an example of the present invention is confirmed from a change in value. On this occasion, the values of the VHR and the residual DC are compared in each of <Evaluation 1> to <Evaluation 4> and no superiority or inferiority is evaluated by comparing the sizes of values between evaluations different in precondition.

(Durability Test)

Obtained liquid crystal cells were driven with 4 V (60 Hz square wave) and were exposed to light emitted from a backlight for 300 hours in a 70° C. oven. The VHR and the residual DC were measured before and after the durability test and the durability was evaluated.

Evaluation 1

Example 1-1

Pixel electrodes made of Ag were formed on a TFT substrate, whereby an element substrate was obtained. A common electrode made of IZO was formed on a transparent substrate, whereby a counter substrate was obtained.

A solution containing a polyamic acid represented by Formula (100) below was applied to electrode-side surfaces of both substrates, followed by drying. A solvent used was a 1:1 solvent mixture (mass ratio) of N-methylpyrrolidone (NMP) and γ-butyrolactone.

The polyamic acid used was one having a degree of imidization of 30% in a solvent.

[Chem. 26]

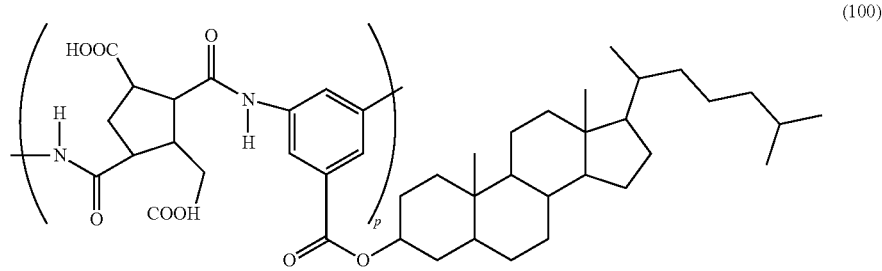

(100)

(where p represents an integer.)

Next, after pre-baking was performed at 80° C. for two minutes, main baking was performed by heating at 200° C. for 40 minutes, whereby a polyimide film was formed on a surface of each of the element substrate and the counter substrate. The obtained polyimide film was subjected to a rubbing treatment.

Next, the substrates provided with the polyimide films were immersed in an isopropyl alcohol solution containing 3% by mass of an isocyanate compound represented by Formula (101) below for 30 minutes while the isopropyl alcohol solution was being heated at 50° C.

[Chem. 27]

(101)

Next, the substrates provided with the polyimide films were immersed in isopropyl alcohol and were ultrasonically treated. Furthermore, the substrates were dried for 20 minutes in an oven set to 100° C.

Next, a source (sealant) of a sealing section was drawn on an alignment film-formed surface of the element substrate. On this occasion, the sealant was drawn so as to be placed in a closed circular pattern in plan view.

After the sealant was drawn, a negative-type liquid crystal composition (negative dielectric anisotropy) in which $\Delta\varepsilon$, which represents the dielectric anisotropy, was −5.5 was dropped on a region of the element substrate that was surrounded by the sealant. The liquid crystal composition used had a nematic liquid crystal phase temperature range of 85° C.

Next, an alignment film-formed surface of the counter substrate was placed opposite to the liquid crystal composition, the element substrate and the counter substrate were joined together, and the sealant was cured.

Next, heating was performed at a temperature not lower than the nematic phase transition temperature (Tni) of the liquid crystal composition for 30 minutes. The liquid crystal composition was subjected to an alignment treatment together with thermally curing the sealant by heating, whereby a liquid crystal cell (liquid crystal display device) of Example 1-1 was obtained.

Comparative Example 1-1

A liquid crystal cell of Comparative Example 1-1 was obtained in substantially the same manner as that used in Example 1-1 except that substrates provided with polyimide films were not immersed in the isopropyl alcohol solution containing the isocyanate compound.

Table 1 is a table showing evaluation results of <Evaluation 1>.

TABLE 1

|  | Before durability test | | After durability test | |
| --- | --- | --- | --- | --- |
|  | VHR (%) | rDC (V) | VHR (%) | rDC (V) |
| Example 1-1 | 98.6 | 0.03 | 98.2 | 0.03 |
| Comparative Example 1-1 | 98.6 | 0.03 | 96.7 | 0.25 |

As a result of evaluation, it became clear from Example 1-1 that the liquid crystal cell including the alignment films treated with the isocyanate compound could suppress the reduction of the VHR and the increase of the residual DC before and after the durability test.

However, in the liquid crystal cell of Comparative Example 1-1 that included alignment films untreated with the isocyanate compound, the VHR and the residual DC after the durability test deteriorated.

Evaluation 2

Example 2-1

Pixel electrodes made of Al were formed on a TFT substrate, whereby an element substrate was obtained. A common electrode made of IZO was formed on a transparent substrate, whereby a counter substrate was obtained.

A solution containing a polyamic acid represented by Formula (102) below was applied to electrode-side surfaces of the respective substrates, followed by drying. A solvent used was a 1:1 solvent mixture (mass ratio) of N-methylpyrrolidone (NMP) and γ-butyrolactone.

The polyamic acid used was one having a degree of imidization of 0% in a solvent.

[Chem. 28]

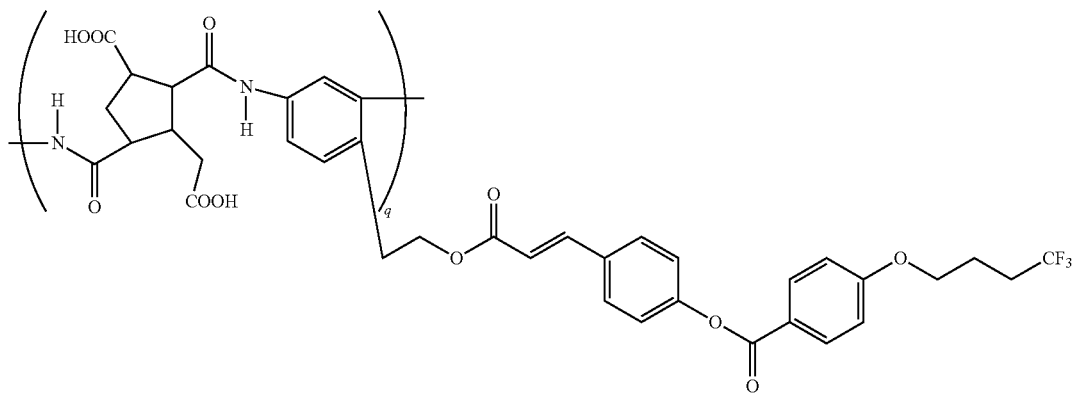

(102)

(where q represents an integer.)

Next, after pre-baking was performed at 80° C. for two minutes, main baking was performed by heating at 200° C. for 40 minutes, whereby a polyimide film was formed on a surface of each of the element substrate and the counter substrate.

The obtained polyimide film was irradiated with a 22 mJ/cm² polarized ultraviolet ray in a direction 40° inclined to a normal direction of the substrate, whereby the polyimide film was subjected to an alignment treatment.

Next, the substrates provided with the polyimide films were immersed in an isopropyl alcohol solution containing 2% by mass of an isocyanate compound represented by Formula (103) below for 60 minutes while the isopropyl alcohol solution was being heated at 70° C.

[Chem. 29]

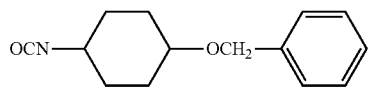

(103)

Next, the substrates provided with the polyimide films were immersed in isopropyl alcohol and were ultrasonically treated. Furthermore, the substrates were dried for 30 minutes in an oven set to 120° C.

Next, a source (sealant) of a sealing section was drawn on an alignment film-formed surface of the element substrate. On this occasion, the sealant was drawn so as to be placed in a closed circular pattern in plan view.

After the sealant was drawn, a negative-type liquid crystal composition in which Δε, which represents the dielectric anisotropy, was −6.0 was dropped on a region of the element substrate that was surrounded by the sealant. The liquid crystal composition used had a nematic liquid crystal phase temperature range of 85° C.

Next, an alignment film-formed surface of the counter substrate was placed opposite to the liquid crystal composition, the element substrate and the counter substrate were joined together, and the sealant was cured.

Next, heating was performed at a temperature not lower than the nematic phase transition temperature (Tni) of the liquid crystal composition for 40 minutes. The liquid crystal composition was subjected to an alignment treatment together with thermally curing the sealant by heating, whereby a liquid crystal cell (liquid crystal display device) of Example 2-1 was obtained.

Comparative Example 2-1

A liquid crystal cell of Comparative Example 2-1 was obtained in substantially the same manner as that used in Example 2-1 except that substrates provided with polyimide films were not immersed in the isopropyl alcohol solution containing the isocyanate compound.

Table 2 is a table showing evaluation results of <Evaluation 2>.

TABLE 2

| | Before durability test | | After durability test | |
|---|---|---|---|---|
| | VHR (%) | rDC (V) | VHR (%) | rDC (V) |
| Example 2-1 | 99.0 | 0.11 | 98.5 | 0.14 |
| Comparative Example 2-1 | 99.1 | 0.10 | 97.0 | 0.8 |

As a result of evaluation, it became clear from Example 2-1 that the liquid crystal cell including the alignment films treated with the isocyanate compound could suppress the reduction of the VHR and the increase of the residual DC before and after the durability test.

However, in the liquid crystal cell of Comparative Example 2-1 that included alignment films untreated with the isocyanate compound, the VHR and the residual DC after the durability test deteriorated.

Evaluation 3

Example 3-1

After pixel electrodes made of Ag were formed on a TFT substrate and an insulating layer was formed so as to cover the pixel electrodes, a common electrode made of IZO was formed on the insulating layer, whereby an element substrate was obtained.

The element substrate was one having electrodes for FFS-mode liquid crystal cells.

A solution containing a polyamic acid represented by Formula (104) below was applied to an electrode-side surface of the element substrate and a surface of a counter substrate that had no electrode, followed by drying. A solvent used was a 1:1 solvent mixture (mass ratio) of N-methylpyrrolidone (NMP) and γ-butyrolactone.

The polyamic acid used was one having a degree of imidization of 60% in a solvent.

[Chem. 30]

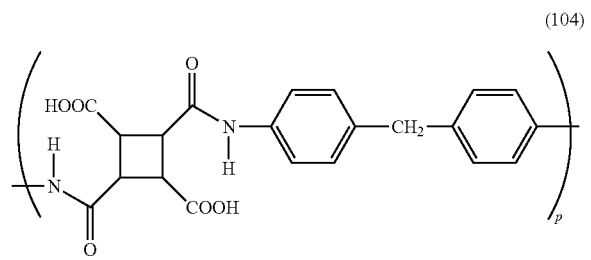

(104)

(where p represents an integer.)

Next, after pre-baking was performed at 80° C. for two minutes, main baking was performed by heating at 200° C. for 40 minutes, whereby a polyimide film was formed on a surface of each of the element substrate and the counter substrate. The obtained polyimide film was subjected to a rubbing treatment.

Next, the substrates provided with the polyimide films were immersed in an isopropyl alcohol solution containing 5% by mass of an isocyanate compound represented by Formula (105) below for 20 minutes while the isopropyl alcohol solution was being heated at 60° C.

[Chem. 31]

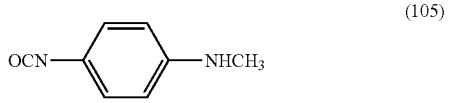

(105)

Next, the substrates provided with the polyimide films were immersed in isopropyl alcohol and were ultrasonically treated. Furthermore, the substrates were dried for 20 minutes in an oven set to 120° C.

Next, a source (sealant) of a sealing section was drawn on an alignment film-formed surface of the element substrate. On this occasion, the sealant was drawn so as to be placed in a closed circular pattern in plan view.

After the sealant was drawn, a negative-type liquid crystal composition in which Δε, which represents the dielectric anisotropy, was −4.5 was dropped on a region of the element substrate that was surrounded by the sealant. The liquid crystal composition used had a nematic liquid crystal phase temperature range of 85° C.

Next, an alignment film-formed surface of the counter substrate was placed opposite to the liquid crystal composition, the element substrate and the counter substrate were joined together, and the sealant was cured.

Next, heating was performed at a temperature not lower than the nematic phase transition temperature (Tni) of the liquid crystal composition for 30 minutes. The liquid crystal composition was subjected to an alignment treatment together with thermally curing the sealant by heating, whereby a liquid crystal cell (liquid crystal display device) of Example 3-1 was obtained.

Comparative Example 3-1

A liquid crystal cell of Comparative Example 3-1 was obtained in substantially the same manner as that used in Example 3-1 except that substrates provided with polyimide films were not immersed in the isopropyl alcohol solution containing the isocyanate compound.

Table 3 is a table showing evaluation results of <Evaluation 3>.

TABLE 3

| | Before durability test | | After durability test | |
|---|---|---|---|---|
| | VHR (%) | rDC (V) | VHR (%) | rDC (V) |
| Example 2-1 | 98.8 | 0.07 | 98.5 | 0.07 |
| Comparative Example 2-1 | 98.7 | 0.08 | 97.8 | 0.19 |

As a result of evaluation, it became clear from Example 3-1 that the liquid crystal cell including the alignment films treated with the isocyanate compound could suppress the reduction of the VHR and the increase of the residual DC before and after the durability test.

However, in the liquid crystal cell of Comparative Example 3-1 that included alignment films untreated with the isocyanate compound, the VHR and the residual DC after the durability test deteriorated.

From the above results, it became clear that examples of the present invention were useful.

INDUSTRIAL APPLICABILITY

An embodiment of the present invention can be applied to a liquid crystal display device in which a flicker is unlikely to occur and which is required to have good display image quality and the like. An embodiment of the present invention can be applied to a method for manufacturing a liquid crystal display device in which a flicker is unlikely to occur and which is required to have good display image quality and the like. An embodiment of the present invention can be applied to an electronic apparatus required to have good display image quality and the like.

REFERENCE SIGNS LIST 10A, 10B Element substrate
15 Pixel electrodes (reflective electrodes)
18R Reflective electrodes
20 Counter substrate
30 Liquid crystal layer
100A, 100B Liquid crystal display device
240 Smartphone (electronic apparatus)
250 Flat-panel television (electronic apparatus)
270 Notebook personal computer (electronic apparatus)
280 Mobile electronic apparatus

The invention claimed is:
1. A liquid crystal display device comprising:
an element substrate;
a counter substrate;
a liquid crystal layer sandwiched between the element substrate and the counter substrate;
reflective electrodes placed on a surface of the element substrate that is located on the liquid crystal layer side; and a pair of alignment films each of which is placed on a corresponding one of a surface of the element substrate that is located on the liquid crystal layer side and a surface of the counter substrate that is located on the liquid crystal layer side,
wherein a liquid crystal composition contained in the liquid crystal layer contains a compound containing an alkoxy group,
the alignment films contain a polymer including polyimide, and
the polyimide is derived from a polyamic acid and contains a side chain represented by the following Formula (1):

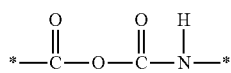
(1)

(where the side chain represented by Formula (1) contains a carbonyl group bonded to a main chain of the polyimide), wherein the side chain is the following Formula (2):

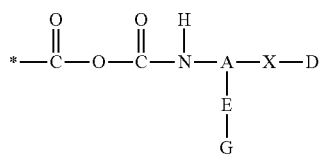
(2)

(where A represents a group obtained by removing three hydrogen atoms from benzene, a linear alkane containing one to 12 carbon atoms, a branched alkane containing one to 12 carbon atoms, a cyclic alkane containing one to 12 carbon atoms, a linear alkene containing one to 12 carbon atoms, a branched alkene containing one to 12 carbon atoms, or a cyclic alkene containing one to 12 carbon atoms or a direct bond;
a hydrogen atom contained in A may be substituted with a fluorine atom, a chlorine atom, or a bromine atom;
X and E represent a —COO— group, a —OCO— group, a —O— group, a —CONH— group, a —NHCO— group, a —NH— group, a —S— group, or a direct bond and may be the same as or different from each other;
D and G represent a hydrogen atom, a phenyl group, a linear alkyl group containing one to 12 carbon atoms, a branched alkyl group containing one to 12 carbon atoms, a cyclic alkyl group containing one to 12 carbon atoms, a linear alkenyl group containing one to 12 carbon atoms, a branched alkenyl group containing one to 12 carbon atoms, or a cyclic alkenyl group containing one to 12 carbon atoms and may be the same as or different from each other;
a hydrogen atom contained in D or G may be substituted with a fluorine atom, a chlorine atom, or a bromine atom; and
when A is the direct bond, a —NH— group, bonded to A in Formula (2), different from X and E is bonded to X and E and G are not contained in the formula), and
wherein the side chain is at least one selected from the group consisting of the following Formulas (201) to (211):

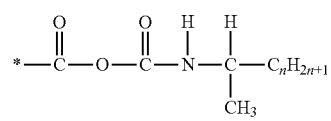
(B-201)

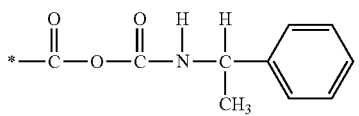
(B-202)

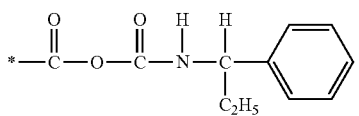
(B-203)

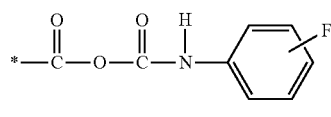
(B-204)

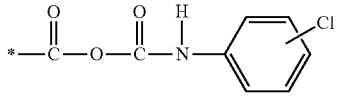
(B-205)

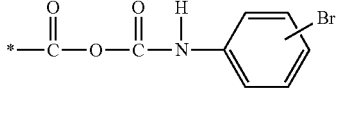
(B-206)

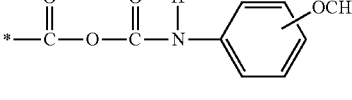
(B-207)

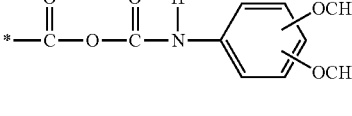
(B-208)

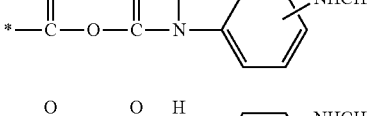
(B-209)

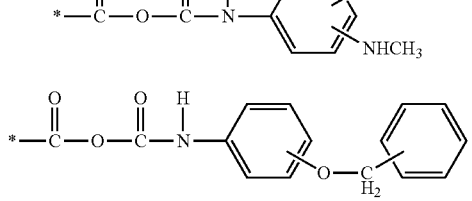
(B-210)

(B-211)

(where n is an integer of 1 to 10).

2. The liquid crystal display device according to claim 1, wherein the reflective electrodes are at least one selected from the group consisting of Al, Ag, Cu, and Zn, and alloys of these.

3. The liquid crystal display device according to claim 1, wherein the liquid crystal composition has negative dielectric anisotropy and contains liquid crystal molecules containing a functional group represented by the following Formula (B):

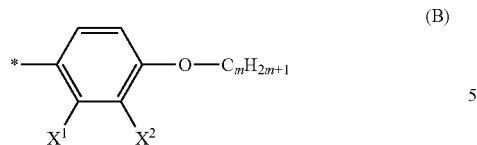

(where one of $X^1$ and $X^2$ represents a fluorine atom or a chlorine atom and the other represents a hydrogen atom, a fluorine atom, or a chlorine atom and m is an integer of 1 to 8).

4. The liquid crystal display device according to claim 3, wherein the liquid crystal composition has a dielectric anisotropy of -4.0 or less.

5. The liquid crystal display device according to claim 1 being a VA mode, an IPS mode, or a FFS mode.

6. An electronic apparatus comprising the liquid crystal display device according to claim 1.

* * * * *